United States Patent
Hulick, Jr. et al.

(10) Patent No.: US 12,299,097 B2
(45) Date of Patent: May 13, 2025

(54) DYNAMIC TRANSACTION-AWARE WEB APPLICATION AUTHENTICATION USING CALL INTERCEPTS

(71) Applicant: Cisco Technology, Inc., San Jose, CA (US)

(72) Inventors: Walter Theodore Hulick, Jr., Pearland, TX (US); David John Zacks, Vancouver (CA); Thomas Szigeti, Vancouver (CA)

(73) Assignee: Cisco Technology, Inc., San Jose, CA (US)

(*) Notice: Subject to any disclaimer, the term of this patent is extended or adjusted under 35 U.S.C. 154(b) by 444 days.

(21) Appl. No.: 17/390,610

(22) Filed: Jul. 30, 2021

(65) Prior Publication Data

US 2022/0318350 A1 Oct. 6, 2022

Related U.S. Application Data

(60) Provisional application No. 63/168,003, filed on Mar. 30, 2021.

(51) Int. Cl.
*G06F 21/32* (2013.01)
*G06F 9/54* (2006.01)
(Continued)

(52) U.S. Cl.
CPC ............... *G06F 21/32* (2013.01); *G06F 9/547* (2013.01); *G06F 21/316* (2013.01); *G06F 21/52* (2013.01);
(Continued)

(58) Field of Classification Search
CPC ........ G06F 21/32; G06F 21/316; G06F 21/52; G06F 21/55; G06F 9/547; G06F 9/541;
(Continued)

(56) References Cited

U.S. PATENT DOCUMENTS 9,684,786 B2 * 6/2017 Foley ..................... G06F 21/53
9,721,080 B2 * 8/2017 Moran .................... G06F 21/32
(Continued)

FOREIGN PATENT DOCUMENTS

| WO | 2018148920 A1 | 8/2018 |
| WO | 2020074887 A1 | 4/2020 |

OTHER PUBLICATIONS

"Passwordless Continuous Authentication", online: acceptto.com, accessed Jul. 29, 2021, 3 pages, Acceptto Corporation.
(Continued)

*Primary Examiner* — Hee K Song
(74) *Attorney, Agent, or Firm* — BEHMKE INNOVATION GROUP LLC; James M. Behmke; James J. Wong

(57) ABSTRACT

According to one or more embodiments of the disclosure, the techniques herein are directed toward a dynamic transaction-aware web application authentication using call intercepts. In one embodiment, a method comprises: intercepting, by a monitoring process, calls made for transactions within an executing application; determining, by the monitoring process, whether a particular intercepted call triggers an enhanced user authentication requirement for a particular transaction; initiating, by the monitoring process in response to the particular intercepted call triggering the enhanced user authentication requirement, a corresponding challenge to adequately authenticate a user for the particular transaction; and allowing, by the monitoring process, the particular intercepted call to proceed for the particular transaction in response to an adequately authenticated user for the particular transaction.

19 Claims, 12 Drawing Sheets

(51) Int. Cl.
 *G06F 21/31* (2013.01)
 *G06F 21/52* (2013.01)
 *G06F 21/55* (2013.01)

(52) U.S. Cl.
 CPC .............. *G06F 21/55* (2013.01); *G06F 9/541* (2013.01); *G06F 2221/033* (2013.01); *G06F 2221/2103* (2013.01); *G06F 2221/2111* (2013.01); *G06F 2221/2113* (2013.01)

(58) Field of Classification Search
 CPC ....... G06F 2221/033; G06F 2221/2103; G06F 2221/2111; G06F 2221/2113
 See application file for complete search history.

(56) References Cited

U.S. PATENT DOCUMENTS

| | | | |
|---|---|---|---|
| 9,769,708 | B2 | 9/2017 | Bisti et al. |
| 10,244,453 | B2 | 3/2019 | Ashrafi et al. |
| 10,326,761 | B2 | 6/2019 | Yang |
| 10,484,113 | B1 | 11/2019 | Benedetto et al. |
| 10,812,460 | B2 | 10/2020 | Kurian et al. |
| 10,915,613 | B2 * | 2/2021 | Himabindu .......... H04L 9/3231 |
| 10,965,365 | B2 | 3/2021 | Foxworthy et al. |
| 2016/0098710 | A1 * | 4/2016 | Suen ..................... G06Q 20/40 705/44 |
| 2017/0011079 | A1 * | 1/2017 | Verma ................... H04L 67/535 |
| 2017/0243223 | A1 * | 8/2017 | Kolotinsky ........ G06Q 20/4016 |
| 2018/0247312 | A1 | 8/2018 | Loganathan et al. |
| 2020/0273033 | A1 | 8/2020 | Oberheide et al. |
| 2021/0248249 | A1 * | 8/2021 | Nair ...................... H04W 12/61 |
| 2022/0138768 | A1 * | 5/2022 | Zhai ................... G06Q 30/0185 705/44 |

OTHER PUBLICATIONS

Donner A., et al., "An MPLS Networking Concept for Satellite Constellations," Conference: 18th International Teletraffic Congress, Providing QoS in Heterogeneous Environments, Berlin, Germany, Aug. 31-Sep. 5, 2003, 11 Pages.

* cited by examiner

Pick a "Low Trust Required" Transaction – it succeeds:

← → C ⚠ Not Secure | localhost:8088/DemoApp/transaction?low1

Executed URL https://localhost:8088/DemoApp/transaction?low1@
Sat Dec 05 17:39:36 CST 2020

FIG. 7

Pick a "High Trust Required" Transaction – it is challenged using MFA:

api-fd0d0e4d.duosecurity.com/frame/prompt?sid=frameless

MFA APP

Choose an authentication method ex. 867539

Log In

Enter a passcode from a text.

Text me new codes

FIG. 9A

After entering the correct code – can now execute the transaction:

```
← → C  ⚠ Not Secure | localhost:8088/demoApp/transaction?duo_code=tCU1JF7ZrdF&state=a1cd47131af6d27edd7b Executed URL https://localhost:8088/demoApp/transaction?duo_code=tCU1JF7ZrdF&state=a1cd47131af6d27edd7b@
Sat Feb 13  14:05:32 CST 2021
```

FIG. 9B

DYNAMIC TRANSACTION-AWARE WEB APPLICATION AUTHENTICATION USING CALL INTERCEPTS

RELATED APPLICATION

This application claims priority to U.S. Prov. Appl. Ser. No. 63/168,003, filed Mar. 30, 2021, entitled DYNAMIC TRANSACTION-AWARE WEB APPLICATION AUTHENTICATION USING CALL INTERCEPTS, by Hulick, Jr., et al., the contents of which are incorporated herein by reference.

TECHNICAL FIELD

The present disclosure relates generally to computer systems, and, more particularly, to dynamic transaction-aware web application authentication using call intercepts.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect. To this end, various application performance management (APM) solutions have emerged that typically rely on instrumentation, which is the process of inserting code into an application, to capture performance data.

Additionally, most Web applications today simply require a username and password to authenticate, where once a user is authenticated, they are no longer checked regardless of what their behavior might be. A limited number of Web applications have additional protections such as Multi Factor Authentication (MFA), which essentially check the user during login, and never again. The current state of Web application security, therefore, suffers from a number of problems. Namely, all transactions are treated the same once a user is authenticated (e.g., whether they perform menial actions or high-security actions), and no further checks are used to determine if additional authentication is warranted. That is, even the Web applications that do some form of situational awareness to trigger MFA only do it one time—at login. If the session was hijacked by a "Man in the Middle" (MITM) attack, it would be not detected or mitigated.

Additionally, the effort to integrate security features such as facial recognition and MFA can be daunting, and with legacy applications may be impossible except through modifying open source libraries or having access to the source code for the Web application itself.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example screen capture from an example of a dynamic transaction-aware web application authentication using call intercepts, particularly where a low-trust transaction is attempted and succeeds;

FIG. 9A illustrates an example screen capture from an example of a dynamic transaction-aware web application authentication using call intercepts, particularly where a high-trust transaction is attempted and prompts a multi-factor authentication;

FIG. 9B illustrates an example screen capture from an example of a dynamic transaction-aware web application authentication using call intercepts, particularly where multi-factor authentication is entered and the high-trust transaction succeeds.

DESCRIPTION OF EXAMPLE EMBODIMENTS

Overview

Figure 1A:
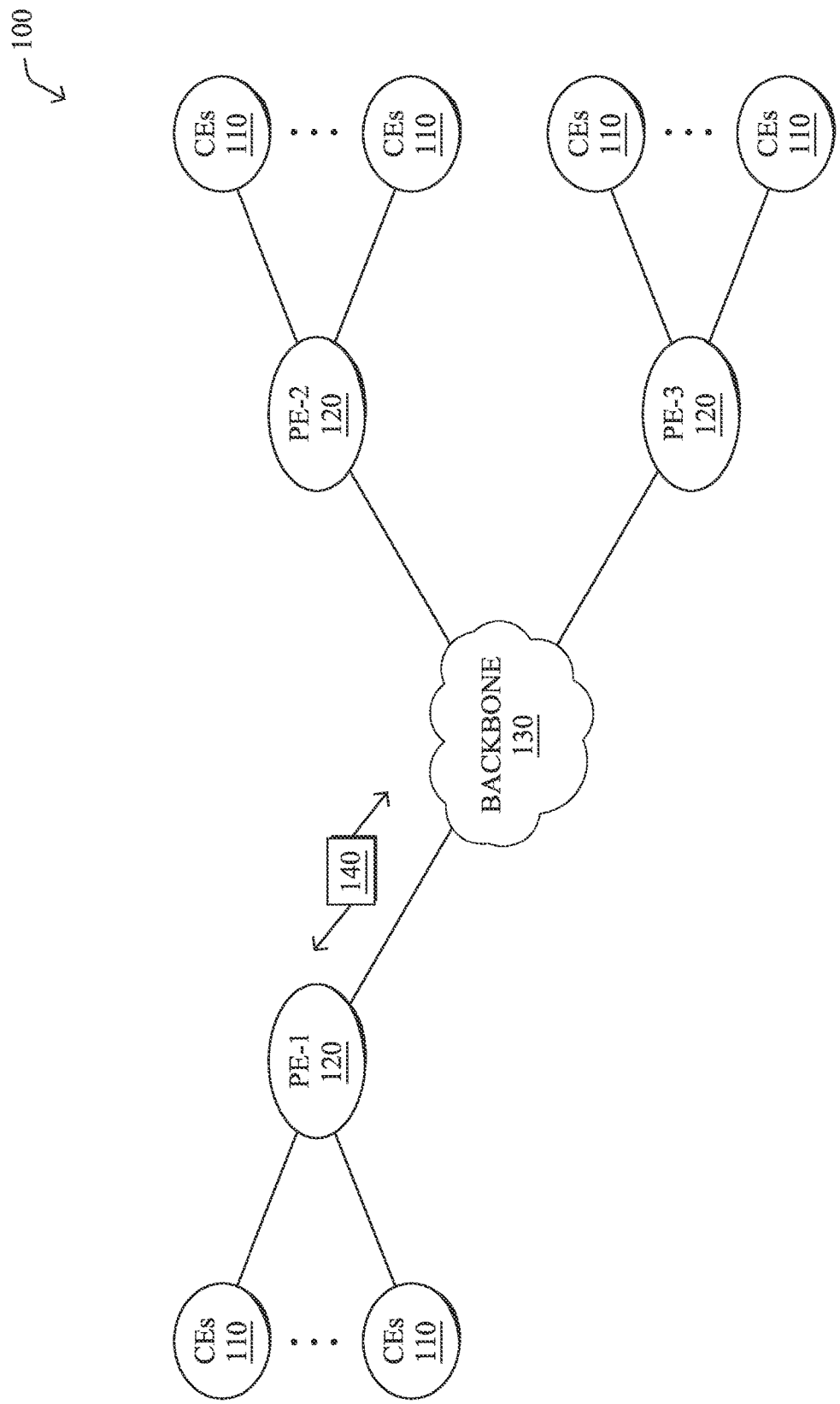
FIGS. 1A-1B illustrate an example computer network.

According to one or more embodiments of the disclosure, the techniques herein are directed toward a dynamic transaction-aware web application authentication using call intercepts. In one embodiment, the techniques herein add dynamically enhanced authentication based on transaction sensitivity and/or user behavior using intelligent policies to any Web application through the use of call interception (e.g., Java-based) of a given transaction and redirection through a security protocol. Notably, this can be performed without having to alter source code of the Web application, since agents along the transaction pathway can intercept transactions in real time and invoke intelligent security policies on a per-transaction basis (e.g., after an initial login), which can be based on a number of dynamic factors, such as behavior, transaction sensitivity, and so on.

Specifically, in one embodiment, a method comprises: intercepting, by a monitoring process, calls made for transactions within an executing application; determining, by the monitoring process, whether a particular intercepted call triggers an enhanced user authentication requirement for a particular transaction; initiating, by the monitoring process in response to the particular intercepted call triggering the enhanced user authentication requirement, a corresponding challenge to adequately authenticate a user for the particular transaction; and allowing, by the monitoring process, the particular intercepted call to proceed for the particular transaction in response to an adequately authenticated user for the particular transaction.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
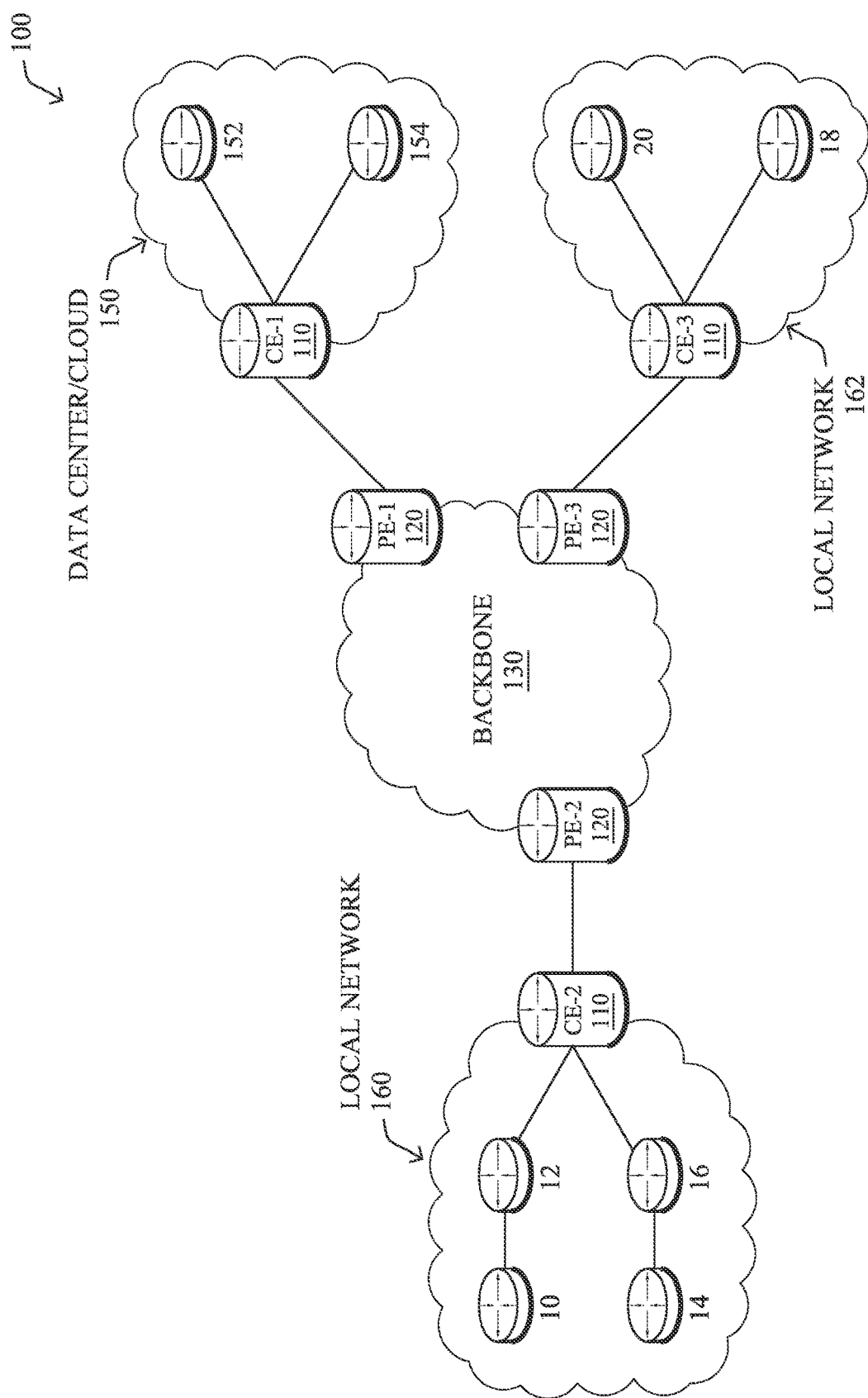

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
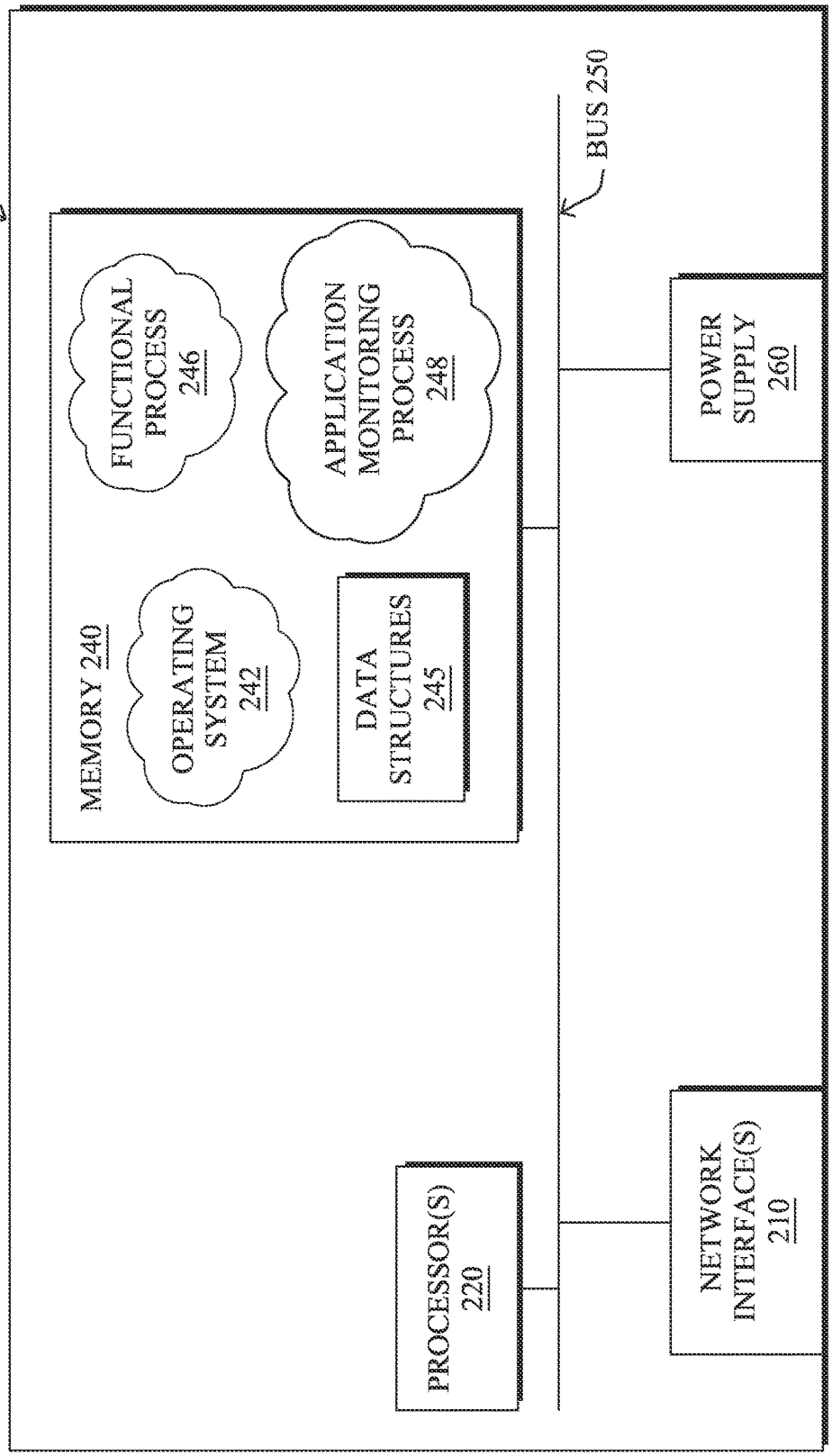
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "application monitoring" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Application Intelligence Platform

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application is consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
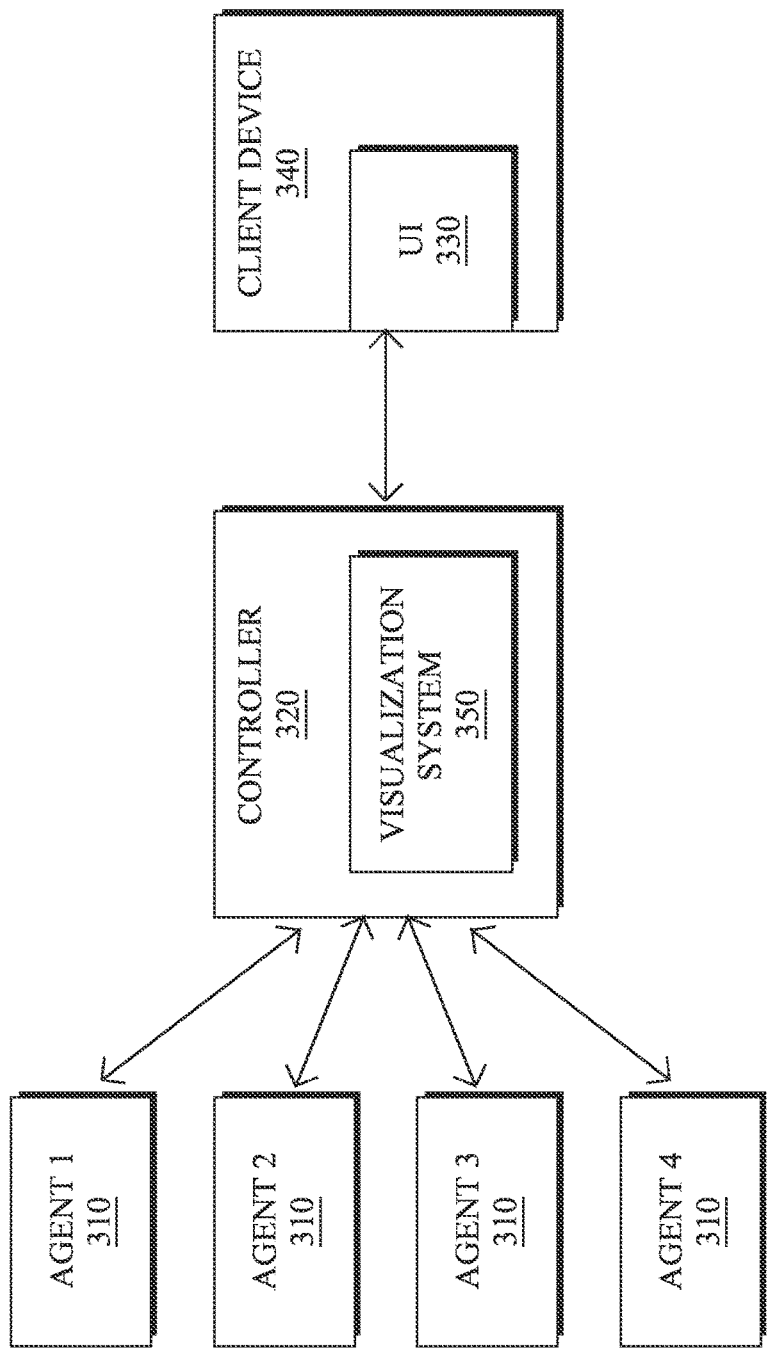
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) application programming interface (API) that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
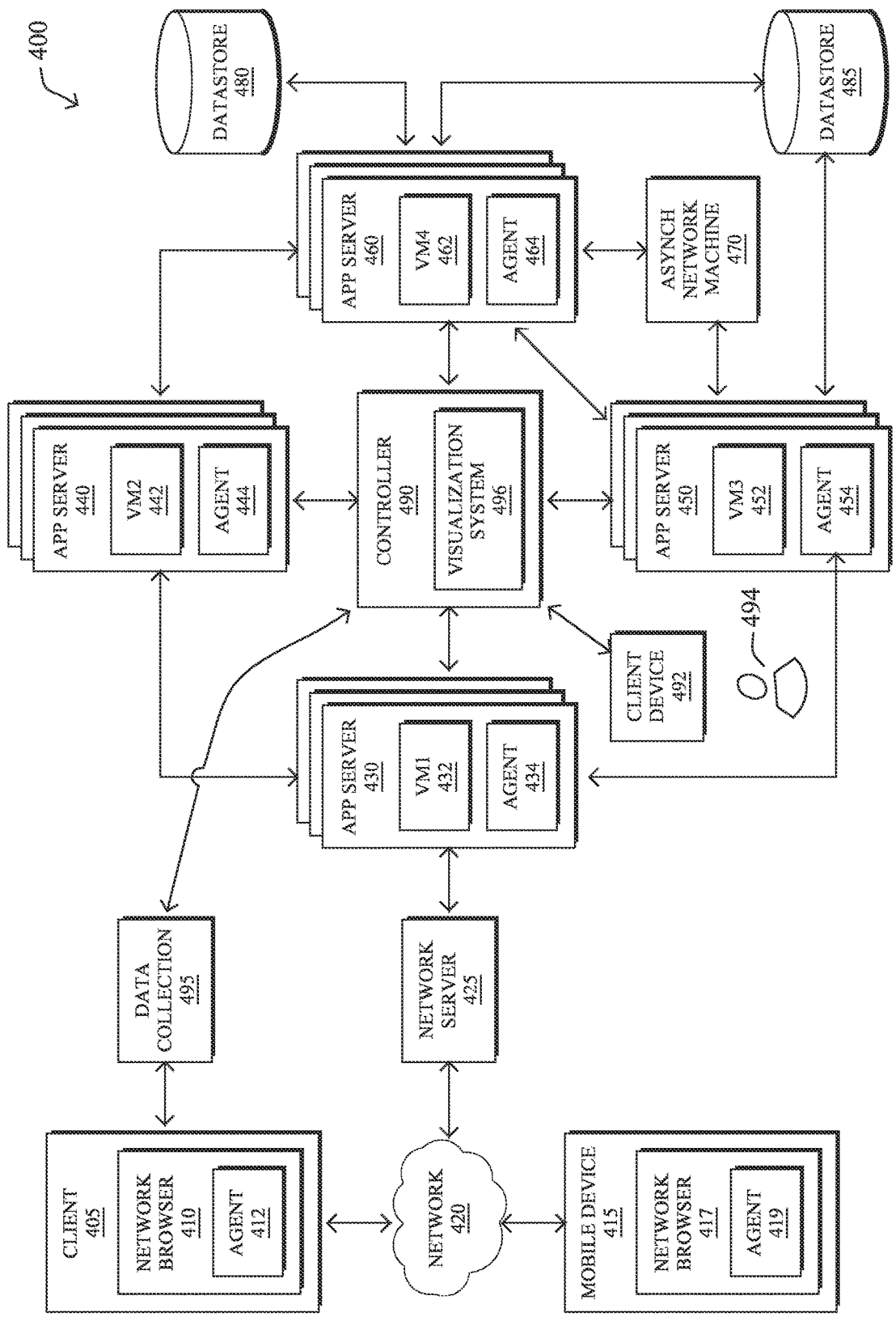
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, workstation or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
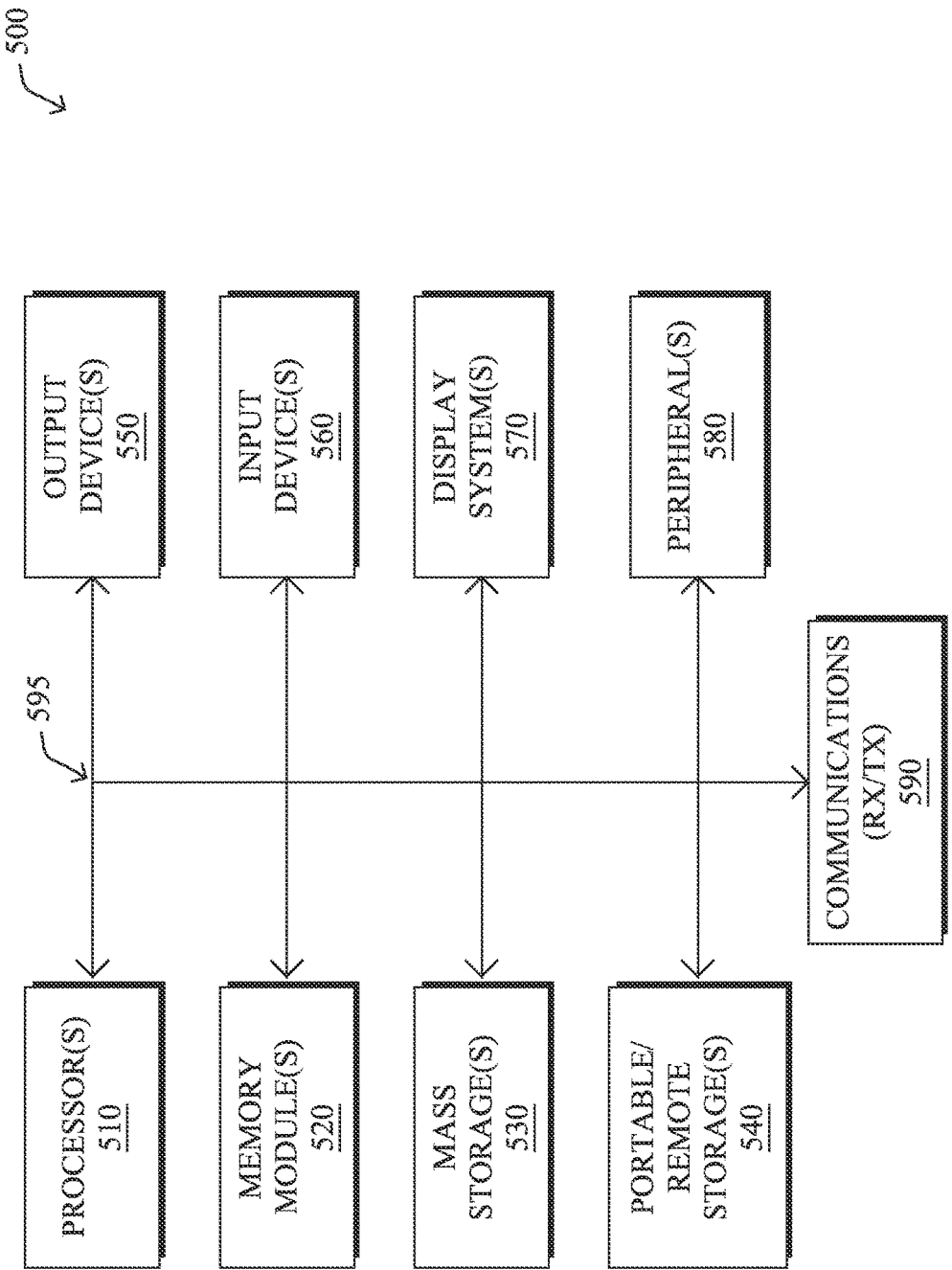
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, handheld computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

Multi-Tenant Java Agent Instrumentation System

As noted above, a Java agent can be used for purposes of instrumenting a Java application. In general, a Java agent takes the form of a Java class that implements a premain method. Similar to the main method in a Java application, the premain method acts as an entry point for the agent. When the Java Virtual Machine (JVM) initializes, the premain method is called before calling the main method of the Java application. The Java agent may also include an agentmain method that can be used, after startup of the JVM. This allows the Java agent to be loaded either in a static manner (e.g., using premain as part of the JVM initialization) or in a dynamic manner, such as by using the Java attach API to call the agentmain method of the agent while the JVM is already running.

Associated with a Java agent may be a manifest that specifies a set of attributes for the agent, as follows:

TABLE 1

| Manifest Attribute | Description |
| --- | --- |
| Premain-Class | This attribute defines the Java agent class that includes the premain method to be used when the JVM initializes. |
| Agent-Class | This attribute defines the Java agent class that includes the agentmain method to be used after the JVM initializes. |
| Boot-Class-Path | This attribute specifies a list of paths to be searched by the bootstrap class loader. |
| Can-Redefine-Classes | This optional, Boolean attribute specifies whether the agent can redefine classes, with a default value of 'false.' |
| Can-Retransform-Classes | This optional, Boolean attribute specifies whether the agent can retransform classes, with a default value of 'false.' |
| Can-Set-Native-Method-Prefix | This optional, Boolean attribute specifies whether the agent can set native method prefix, with a default value of 'false.' |

When used, the Java agent can instrument the application via any or all of the following approaches:
  Redefining or retransforming classes at runtime to change the bodies of methods, the constant pool, and/or attributes.
  Modifying the failure handling of methods to allow for retry.

This allows the Java agent to monitor the performance of the application, apply security rules to the application, and the like.

Today, there are more than fifty different Java agents in existence. The majority of these agents are open source 'hacks' designed to transform classes at runtime for various reasons. However, there are also commercial Java agents that are far more popular and used primarily for purposes of application performance management (APM).

A more recent paradigm shift has emerged in the form of Runtime Application Self Protection (RASP). Similar to APM, many RASP implementations also rely on a Java agent to instrument the application. In this case, though, the Java agent applies to the instrumentation to the classes/methods of the application that affect 'behavior,' to determine whether the security of the application has been breached. In other words, these agents are generally engineered differently than those for APM in that they are heavily focused on security events, as opposed to performance metrics.

Unfortunately, the design of Java agents with a specific purpose in mind forces application developers to make a choice between technologies such as APM, RASP, and the like.

Certain embodiments herein, therefore, may use a Java agent that allows multiple tenants to share use of the agent for purposes of instrumenting an application. In some aspects, the multi-tenant agent allows different technologies, such as APM, RASP, etc., to coexist and across different vendors. In further aspects, the techniques also support the complexities of the JPMS in Java 9+, to provide proper classloading and oversee instrumentation missteps, removing the burdens associated with supporting a full Java agent across multiple vendors.

Specifically, according to one or more embodiments described herein, a device launches a core agent for a Java application. The core agent loads a first tenant and a second tenant, each tenant having its own isolated class loader. The device instruments, via the core agent and by each tenant, the Java application to capture data regarding execution of the Java application. The device then provides the captured data to a user interface.

Figure 6:
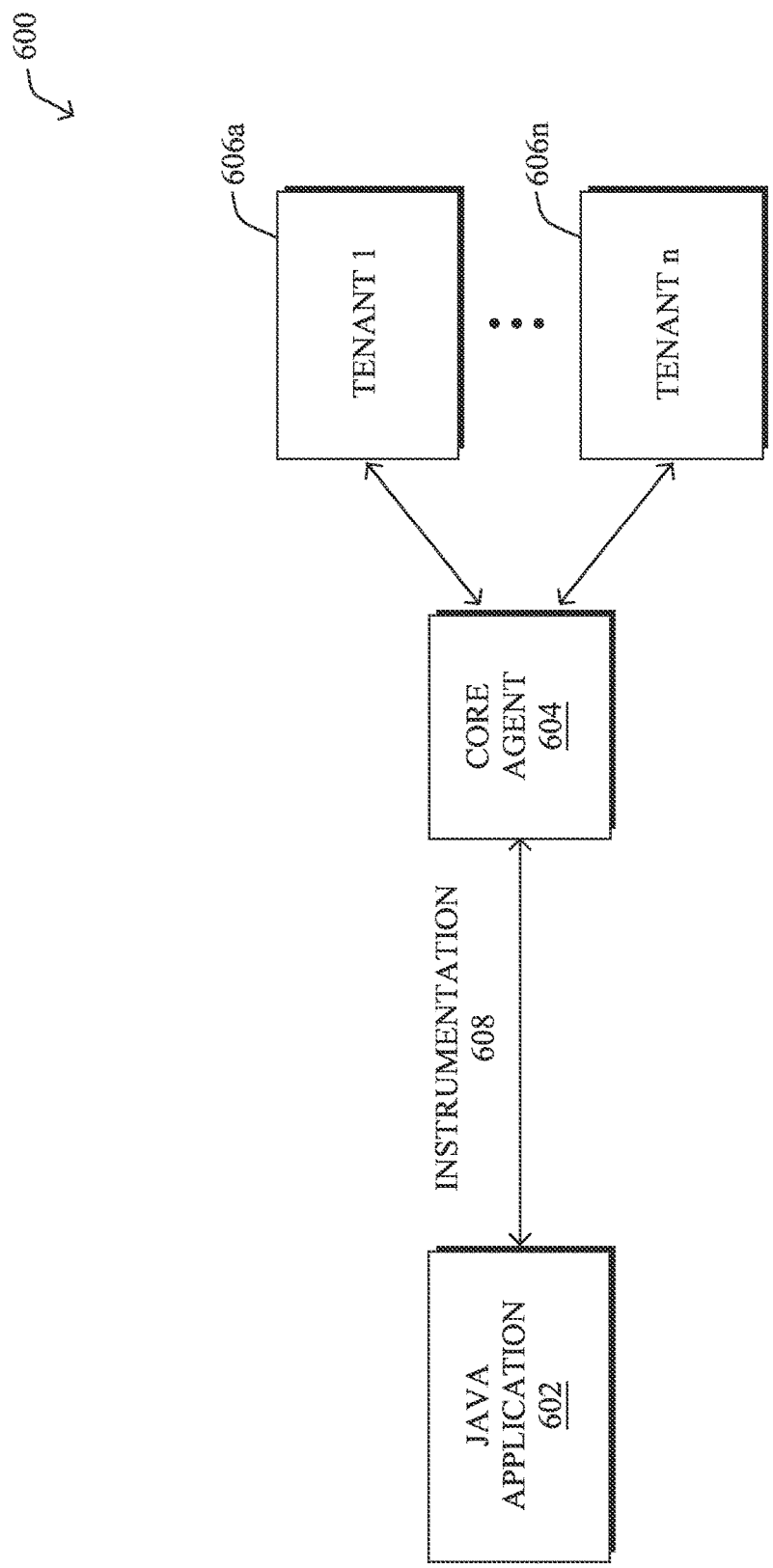
FIG. 6 illustrates an example simplified architecture for a multi-tenant agent.

Operationally, FIG. 6 illustrates an example simplified architecture 600 for a multi-tenant agent, according to various embodiments. As shown, architecture 600 may include a Java application 602, a core agent 604, and a plurality of tenants 606a-606n (e.g., a first through $n^{th}$ tenant). During operation, core agent 604 may function to insert instrumentation 608 into Java application 602 on behalf of tenants 606a-606n for any number of purposes. For example, in one embodiment, tenant 606a may be an APM utility that monitors the performance of Java application 602, while tenant 606n may be a RASP utility that implements a number of security checks within Java application 602.

In some embodiments, Java application 602 may be a Java 9+ application executed within the Java Platform Module System (JPMS) 602. As would be appreciated, a key distinction in JPMS over prior versions of Java is the support of 'Java modules' within an application, such as Java application 602. In general, a Java module may include the following information as part of a module descriptor:

A name that uniquely identifies the module.
A set of dependencies between that module and those on which it depends.
A listing of the packages that it makes available to other modules via export. Note that this must be done explicitly and that a package is implicitly unavailable to other modules, by default.
The services that are offered by the module.
The services that the module consumes.
The other modules that are allowed to use reflection with the module.

In addition to the module descriptor, each Java module may include any number of related packages (e.g., code) and, potentially, other resources (e.g., images, XML, etc.), as well.

More specifically, a module descriptor for a Java module may utilize any or all of the following directives:

exports—this directive specifies the packages of the module that are accessible by other modules.
uses—this directive specifies which service(s) are used by the module. In general, a service is an object for a class that implements an interface or extends the abstract class specified in this directive.
provides—this directive specifies that a module provides a particular service (e.g., the interface or abstract class from the uses directive), as well as the service provider class that implements it.
opens—this directive specifies the package(s) of the module that are accessible to other modules. Depending on its use, this directive can be used to allow all packages in the module to be accessed during runtime or used to limit runtime access by specified modules to certain modules.

A key feature of Java modules is the ability to restrict access between modules. Indeed, in Java version 8 and prior, the Reflection API could be used to access all classes in a package, including its private classes, regardless of the access specifier used. With Java modules, classes in packages within a module need to have permission to access a class and to perform reflection on a class. This is done by a module "exporting" itself and certain packages to another module that "reads" that module and its exported packages. In addition, a module can "open" itself to another module, to allow reflection.

To better describe the techniques herein, the following terminology is used:

ByteCode Instrumentation (BCI)—dynamically modifying Java classes for the purpose of instrumentation (e.g., instrumentation 608).
JMX MBeans—a managed Java object, similar to a JavaBeans component, that follows the design patterns set forth in the JMX specification. An MBean can represent a device, an application, or any resource that needs to be managed.
JMX Attribute—Defines a metric and metric data type exposed by the MBean.
Javassist—This is a popular BCI toolkit used to instrument classes.
Boot Class(es)—Core Java classes loaded by the "Boot Class" loader (Java bootstrap native loader).
Non-Boot Class(es)—Classes found about the Boot loader in Extension, Application, or Web Application loaders
Handler—This is an intercepting class that contains a method to call on entry into an instrumented method and method to call on exit from an instrumented method.
Transform—The act of altering the class bytes before loading.

In general, tenants 606a-606n are specific functional modules that share core agent 604 with other tenants. In some embodiments, each tenant 606 may have its own, isolated class loader designed such that tenants 606a-606n do not conflict with one another. In further embodiments, each tenant 606 may have direct access to core agent 606 via the classes in core agent 604, which is the parent for the tenant class loader. During use, each tenant 606 may reside in a specific "tenants" folder within core agent 604 and may be configured via .yaml files.

In various embodiments, core agent 604 may leverage the javaagent architecture built into Java and be configured via an agentConfig.yml or similar file. More specifically, core agent 604 may be divided into three areas:

Boot—this resides in the boot loader used to load Java application 602

Premain—this method resides in the application class loader and launches agent 604 to set up the Agent Loader.

Agent Loader—this is the loader for agent 604 and prevents conflicts with Java application 602. In addition, agent libraries are isolated from one another.

As noted, core agent 604 may leverage handlers, to insert instrumentation 608 into Java application 602. More specifically, handlers are instrumentation points to intercept or gain control of the method entry or exit within Java application 602 and controlled via configuration. For example, a handler may receive an object instance and all of its arguments within Java application 602, as well as the return value on exit and any exceptions that may be raised. In some embodiments, the handlers may use Reflection on any classes that are not in the boot loader (a core Java class), since those classes are directly accessible via a class loader designation. In further embodiments, the handlers can pass information via Thread Local and access other handlers in the same tenant 606 (e.g., using an API call). Handlers also have the option of intercepting entry/exit events and catch exceptions via configuration, as well as receive the object instance and, on exit, all arguments, the return value, and any exceptions raised. Control over a single handler can be regulated a handler file, e.g., handlername.properties.

Note that a multi-tenant agent described above is only one example of an agent that may be used by the techniques herein, and its description above is not meant to be limiting to the scope of the present disclosure.

Dynamic Transaction-Aware Web Application Authentication

As noted above, most Web applications today simply require a username and password to authenticate, where once a user is authenticated, they are no longer checked regardless of what their behavior might be. A limited number of Web applications have additional protections such as Multi Factor Authentication (MFA), which essentially check the user during login, and never again. The current state of Web application security, therefore, suffers from a number of problems. Namely, all transactions are treated the same once a user is authenticated (e.g., whether they perform menial actions or high-security actions), and no further checks are used to determine if additional authentication is warranted. That is, even the Web applications that do some form of situational awareness to trigger MFA only do it one time—at login. If the session was hijacked by a "Man in the Middle" (MITM) attack, it would be not detected or mitigated.

As additionally noted above, the effort to integrate security features such as facial recognition and MFA can be daunting, and with legacy applications may be impossible except through modifying open source libraries or having access to the source code for the Web application itself.

The techniques herein, therefore, are directed toward a dynamic transaction-aware web application authentication using call intercepts. As described in greater detail below, the techniques herein add dynamically enhanced authentication based on transaction sensitivity and/or user behavior using intelligent policies to any Web application through the use of call interception (e.g., Java-based) of a given transaction and redirection through a security protocol. Notably, this can be performed without having to alter source code of the Web application, since agents along the transaction pathway can intercept transactions in real time and invoke intelligent security policies on a per-transaction basis (e.g., after an initial login), which can be based on a number of dynamic factors, such as behavior, transaction sensitivity, and so on.

Operationally, when paired with an Application Security product (such as the SecureApp offered by Cisco Systems Inc. of San Jose, California) and/or other similar type products capable of identifying potential security breaches or threats based on security analytics—machine learning (ML) algorithms and/or artificial intelligence (AI) operations can "flag" situations where an "enhanced authentication method" would be used to verify a user before executing a transaction.

For example, current choices with this product could be:

Multi Factor Authentication (MFA), such as the DUO app offered by Cisco Systems Inc.;

Facial Recognition;

Etc.

Moreover, the techniques herein may be performed automatically and work on any web application—no coding is necessary. That is, the "enhanced authentication method" may be injected into the Web Entry point (in the form of an agent) in the application, and would intercept every inbound application. It would then compare the following information against a policy which would compare against:

Current User; and

Transaction being accessed.

The policy may be continuously updated the using ML and AI in a backend analytics server, analyzing things like Login Failures, File Access, and other information previously captured by other security products (e.g., SecureApp) or it could be a static policy put together by the application team, essentially manually tagging admin functions or sensitive transactions, as well as certain logins from certain geographic locations, and so on.

According to one or more embodiments of the present disclosure, a Web application may be instrumented with a java agent (e.g., the Multi-Tenant Agent described in detail above), which intercepts calls into the Application API. Once the calls are intercepted, the following sequence illustratively occurs:

The User/Username is determined; and

The Transaction Name is determined.

Now, depending on the current policy for that User and/or Transaction, a decision is made:

The Transaction is allowed to pass thru; or

The Transaction is intercepted and the User is "challenged".

According to the techniques herein, the configuration of the policy defines which challenge is issued at any given time, e.g., facial recognition, MFA, or otherwise.

For example, as shown in display 700 of FIG. 7, with an initial login in place (e.g., username and password), a low-trust transaction may be detected, and allowed to succeed. However, once a high-trust transaction (or other transaction that triggers the increased security policy) is detected by the java agent intercepting a transaction call, then the security policy engine may determine whether to initiate an additional clearance action, and which particular clearance action to perform. That is, the techniques herein are dynamic, and authentication challenges can occur on a transaction or user behavior basis, not just a login basis.

Figure 8:
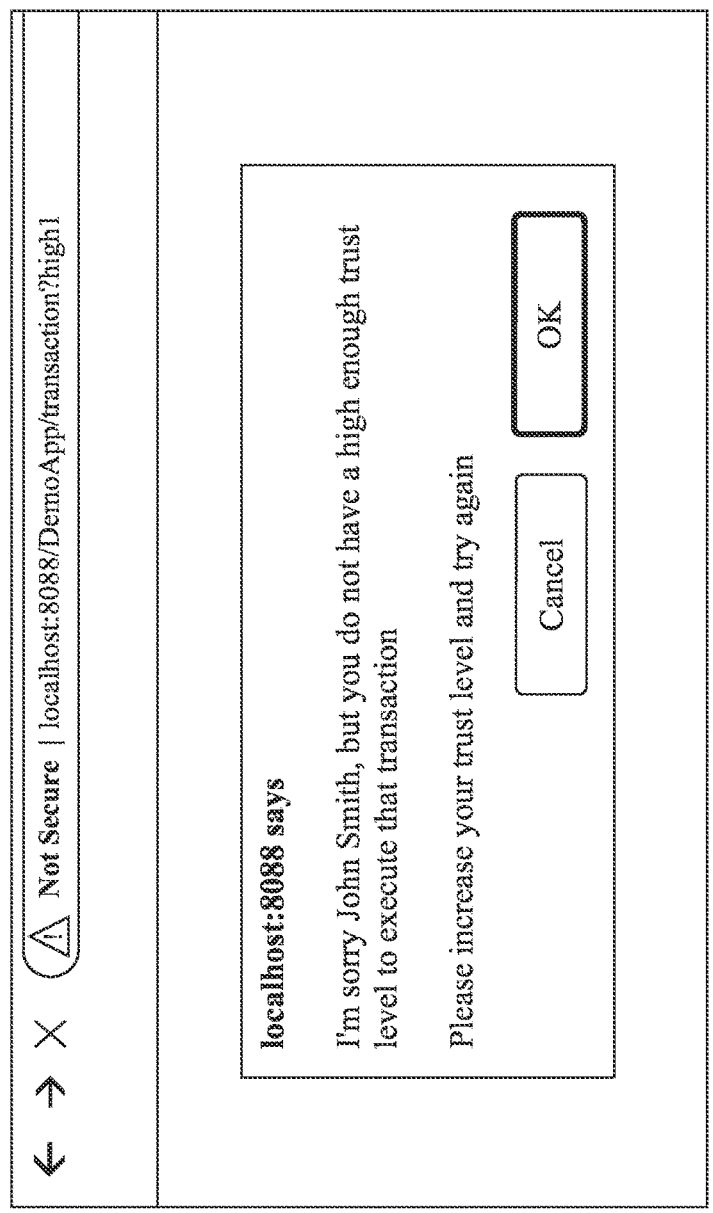
FIG. 8 illustrates an example screen capture from an example of a dynamic transaction-aware web application authentication using call intercepts, particularly where a high-trust transaction is attempted and is prevented.

For example, with reference to display 800 of FIG. 8, assume that a facial recognition authentication type is used. When a Web Service call (containing username) is made to a facial recognition backend, the facial recognition backend may return either a yes/no authentication, or a "trust score" (e.g., between 0 and 100) tied to the user based on their face being in view of a camera. In particular, the trust score may then be compared with a policy with lists the necessary minimum trust score to execute the particular transaction. If the user's trust score is not high enough (or if the user is not authenticated), then the transaction is prevented/aborted, and the user may receive a dialog box (as shown) informing the user that their transaction was declined due to the increased security needed for that transaction, and optionally that they need to increase their trust score to execute that transaction (e.g., look directly at the camera, remove sunglasses/hats, etc.). At this point, the user can increase their trust score by looking into their camera, or picking up their phone (with an associated authentication app), and allowing it to perform facial recognition via the backend authentication app. (Note also, of course, that if the trust score is insufficient since the user is not authenticated, then the high-trust transaction will never take place, even though the user is logged into the system.)

FIGS. 9A-9B illustrate another example, such as where the MFA authentication type is used for high-trust transactions. For instance, the username and transaction name may be compared against the current policy, such that if the policy has a match then a call is made to the MFA backend (e.g., using an MFA vendor software development kit (SDK)) which is integrated as a "tenant" into the Java Agent to create an MFA URL, which causes the application to be forced (by the Java Agent) to redirect to the MFA backend. For instance, as shown in display 900*a* in FIG. 9A, the URL produces the MFA dialog from the backend (MFA App) asking the user to authenticate. If the user is unable to authenticate, they simply will not be re-routed back to the transaction. If they are able to authenticate, based on the call made to the MFA App, the MFA App will re-route back to that transaction, but this time with credentials identifying that they were authenticated, and this time the transaction will pass through, as shown in display 900*b* in FIG. 9B.

In closing, the techniques herein extend authentication to decide whether to re-authenticate at a higher security level during runtime of a Web application, per transaction, and without modifying or accessing the Web application source code (due to the use of java agents and call intercepts, taking advantage of instrumentation (e.g., byte code instrumentation). In this manner, not all transactions need be treated the same, and dynamic policies may be implemented by the Web application overlay based on any number of factors (e.g., user security level, user activity, transaction type, transaction geo-location, transaction particulars (e.g., higher monetary values, greater number of file transfers, etc.), and so on.

That is, the auto-injected dynamic MFA thus extends authentication beyond a typical login, and may define public, private (logged in), sensitive (requiring MFA), and so on, with the divisions between the access levels being dynamically adjusted based on transaction specifics, user behavior, and other factors. For instance, the techniques herein may differentiate between an administrator who successfully logged in with a single attempt, versus an administrator who entered two or more incorrect passwords before being authenticated. For example, the former administrator may have a higher level of trust for certain transactions, whereas the latter administrator may be allowed basic access to the Web application, but once a higher-trust transaction is attempted, would be presented with an increased MFA operation, accordingly. Additionally, a user who has just used a search engine to search for "how to leave the country quickly" or "how to break someone's password" may be treated differently (i.e., with more scrutiny).

In addition, while prior techniques use MFA and facial recognition, such prior techniques have predetermined policy points, such as at login, at specific transactions, etc. However, with the techniques herein, where and whether to perform MFA is a decision that can be dynamically made by the Web application overlay, in real time (and after the initial authentication), without accessing or even restarting the Web application source code, through use of the instrumentation and call intercepts, as described above, and without installing any software on the client devices.

The techniques described herein, therefore, provide for a dynamic transaction-aware web application authentication using call intercepts. In particular, the techniques herein are "codeless", meaning no access to the Web application source code is needed, whether in terms of modification or initial programming, making the solution herein a frictionless integration with existing (e.g., legacy and current) and future applications. That is, since the techniques herein are based on the Java agent intercept, they are seamless, with no coding involved, and without the need to have the source code or an SDK, and it will work for any Web application. Additionally, the techniques herein combine transaction/user behavior awareness with the power of MFA and/or Facial Recognition technologies into a total application security package that not only detects abnormal behavior but has the power to go to the source of the behavior (the user) and verify the true identity of that user, on demand, using behavioral analytics (e.g., ML, AI) and other security analytics. In this manner, the techniques herein go far beyond simple identity management, but instead provide frictionless dynamic identity management. Moreover, the techniques herein are beneficial for the original source code owners (Web application developers) to add enhanced security to their applications, as well as for third-party integration, such as payment processing applications, employee/family monitoring security applications, and so on.

Illustratively, the techniques described herein may be performed by hardware, software, and/or firmware, such as in accordance with the illustrative application monitoring process 248, or another Java agent, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

Figure 10:
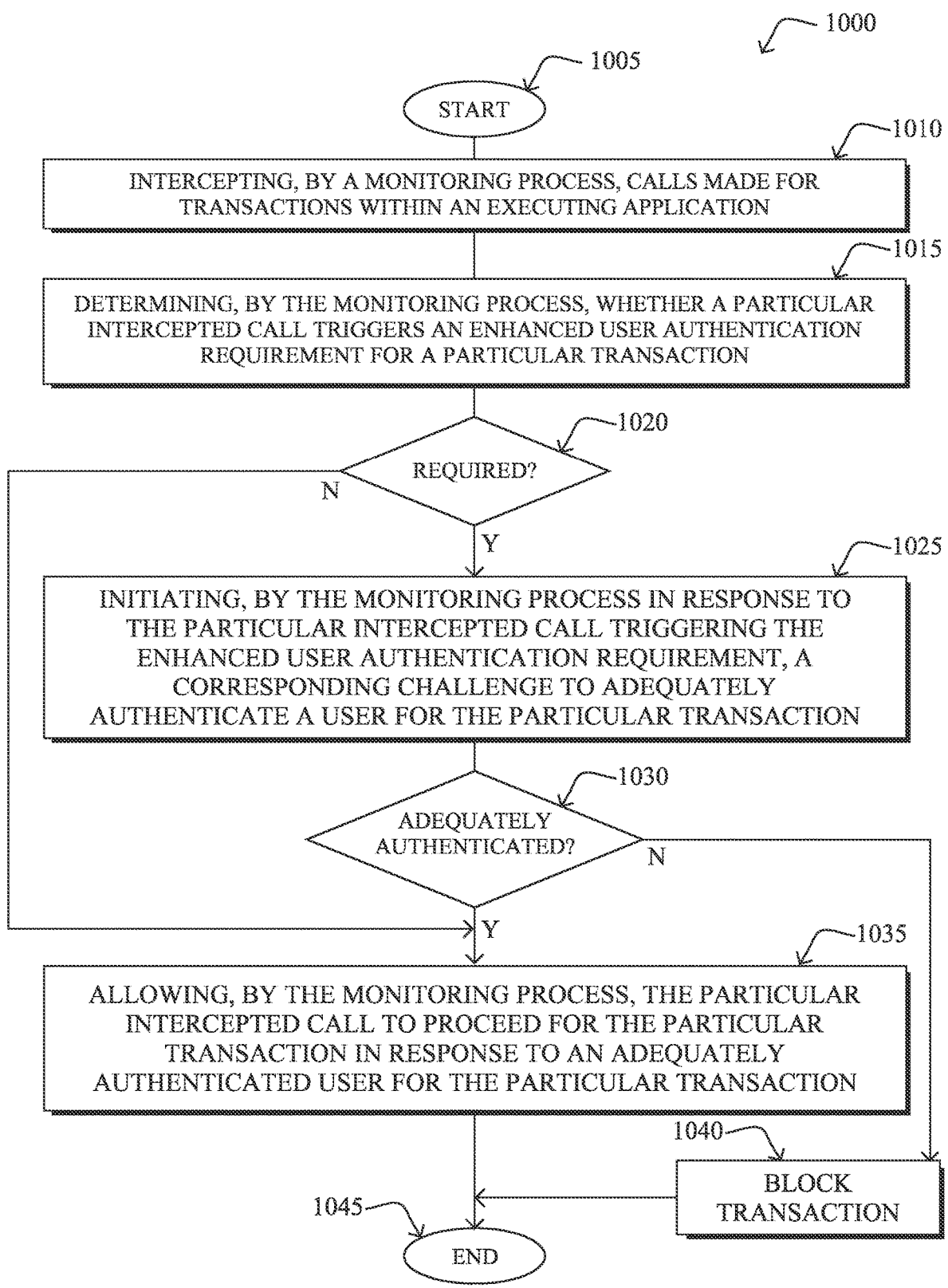
FIG. 10 illustrates an example simplified procedure for dynamic transaction-aware web application authentication using call intercepts.

FIG. 10 illustrates an example simplified procedure 1000 for dynamic transaction-aware web application authentication using call intercepts in accordance with one or more embodiments described herein. For example, a non-generic, specifically configured device (e.g., device 200, particularly an agent process on the device to instrument a Java application) may perform procedure 1000 by executing stored instructions (e.g., process 248, such as an application monitoring process). The procedure 1000 may start at step 1005, and continues to step 1010, where, as described in greater detail above, a monitoring process intercepts calls made for transactions within an executing application. For instance, in one embodiment, intercepting calls made for transactions within the executing application comprises intercepting calls into an application programming interface (API) of the executing application with a Java agent monitoring execution of the executing application.

In step 1015, the monitoring process determines whether a particular intercepted call triggers an enhanced user authentication requirement for a particular transaction, as detailed above. For instance, determining whether the particular intercepted call triggers the enhanced user authentication requirement for the particular transaction may be based on whether the user is already adequately authenticated for the particular transaction. That is, the user may be already authenticated to a first level by the executing application, and the particular transaction requires an enhanced authentication of the user to a higher level than the first level for the user to be adequately authenticated for the particular transaction. Alternatively, when the user is not authenticated yet by the executing application, the particular transaction may require an (e.g., any) authentication of the user for the user to be adequately authenticated for the particular transaction.

Notably, as described above, step 1015 may be based on a number of factors, depending on implementation and configuration. For example, the process may be based on determining a geographic location of the user, such that determining whether the particular intercepted call triggers the enhanced user authentication requirement for the particular transaction is based at least in part on the geographic location of the user. Alternatively or in addition, the process may be based on maintaining a list of transactions that require enhanced authentication, such that determining whether the particular intercepted call triggers the enhanced user authentication requirement for the particular transaction is based on the particular transaction being within the list of transactions that require enhanced authentication. In still another embodiment, the process may be based on determining a username of the user and determining a current authentication level of the user based on a database lookup using the username, such that determining whether the particular intercepted call triggers the enhanced user authentication requirement for the particular transaction is based at least in part on the current authentication level of the user. Many other options are available, and those mentioned herein are merely examples for illustration.

Furthermore, the determination in step 1015 may be based on first determining one or more indicators of behavior of the user, such that determining whether the particular intercepted call triggers the enhanced user authentication requirement for the particular transaction is based at least in part on the one or more indicators of behavior of the user. For example, as described above, determining whether the particular intercepted call triggers the enhanced user authentication requirement for the particular transaction may be based on a machine learning based classification of the one or more indicators of behavior of the user as suspicious behavior, or as anomalous behavior.

If it is decided in step 1020 that a particular intercepted call requires an enhanced user authentication for the particular transaction, then in response, in step 1025, the monitoring process initiates a corresponding challenge to adequately authenticate a user for the particular transaction. For example, a standard challenge may be issued, or the process may first determine, from a collection of possible challenges, a particular challenge necessary to adequately authenticate the user for the particular transaction. The corresponding challenge to adequately authenticate the user for the particular transaction may comprise a multi-factor authentication, a biometric identification of the user (e.g., selected from a group consisting of: facial recognition; fingerprint recognition; and retina scanning, etc.), or other authentication mechanism. Note, too, that in certain embodiments, the corresponding challenge to adequately authenticate the user for the particular transaction comprises a pop-up window apart from the executing application, as mentioned above.

If it is confirmed that the user is adequately authenticated in step 1030 (e.g., whether the user is an adequately authenticated user for the particular transaction, such as based on a sufficient level of confidence that the user is who the user purports to be, and so on, as detailed above), or also when no enhanced authentication is required in step 1020 above, then in step 1035 the monitoring process allows the particular intercepted call to proceed for the particular transaction (i.e., in response to an adequately authenticated user for the particular transaction). For instance, allowing the particular intercepted call to proceed for the particular transaction may comprise passing the intercepted call through to a destination of the intercepted call (e.g., without the executing application even knowing that an additional authentication was performed).

If the user is not adequately authenticated in step 1030, then in step 1040 the transaction is blocked, accordingly (e.g., prevented, dropped, forced error message, generated report, etc.).

The simplified procedure 1000 may then end in step 1045, notably with the ability to continue ingesting and processing data. Other steps may also be included generally within procedure 1000 that are not generally shown. Note also that in accordance with the techniques herein, the steps above (and in particular determining whether the particular intercepted call triggers the enhanced user authentication requirement for the particular transaction, initiating the corresponding challenge to adequately authenticate the user for the particular transaction, and allowing the particular intercepted call to proceed for the particular transaction in response to the adequately authenticated user for the particular transaction) may be advantageously performed without participation by the executing application, as described above.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   intercepting, by a monitoring process and with a Java agent that monitors execution of an executing application with instrumentation, calls made for transactions within the executing application;
   determining, by the monitoring process, whether a particular intercepted call triggers an enhanced user authentication requirement for a particular transaction;
   initiating, by the monitoring process in response to the particular intercepted call triggering the enhanced user authentication requirement, a corresponding challenge to adequately authenticate a user for the particular transaction; and
   allowing, by the monitoring process, the particular intercepted call to proceed for the particular transaction in response to an adequately authenticated user for the particular transaction by passing the particular intercepted call through to a destination of the particular intercepted call.

2. The method as in claim 1, wherein determining whether the particular intercepted call triggers the enhanced user authentication requirement for the particular transaction is based on whether the user is already adequately authenticated for the particular transaction.

3. The method as in claim 2, wherein the user is already authenticated to a first level by the executing application, and wherein the particular transaction requires an enhanced authentication of the user to a higher level than the first level for the user to be adequately authenticated for the particular transaction.

4. The method as in claim 2, wherein the user is not authenticated yet by the executing application, and wherein the particular transaction requires an authentication of the user for the user to be adequately authenticated for the particular transaction.

5. The method as in claim 1, further comprising:
   determining one or more indicators of behavior of the user, wherein determining whether the particular intercepted call triggers the enhanced user authentication requirement for the particular transaction is based at least in part on the one or more indicators of behavior of the user.

6. The method as in claim 5, wherein determining whether the particular intercepted call triggers the enhanced user authentication requirement for the particular transaction is based on a machine learning based classification of the one or more indicators of behavior of the user as suspicious behavior.

7. The method as in claim 5, wherein determining whether the particular intercepted call triggers the enhanced user authentication requirement for the particular transaction is based on a machine learning based classification of the one or more indicators of behavior of the user as anomalous behavior.

8. The method as in claim 1, further comprising:
   determining a geographic location of the user, wherein determining whether the particular intercepted call triggers the enhanced user authentication requirement for the particular transaction is based at least in part on the geographic location of the user.

9. The method as in claim 1, further comprising:
   maintaining a list of transactions that require enhanced authentication, wherein determining whether the particular intercepted call triggers the enhanced user authentication requirement for the particular transaction is based on the particular transaction being within the list of transactions that require enhanced authentication.

10. The method as in claim 1, wherein the corresponding challenge to adequately authenticate the user for the particular transaction comprises a multi-factor authentication.

11. The method as in claim 1, wherein the corresponding challenge to adequately authenticate the user for the particular transaction comprises a biometric identification of the user selected from a group consisting of: facial recognition; fingerprint recognition; and retina scanning.

12. The method as in claim 1, further comprising:
determining, from a collection of possible challenges, a particular challenge necessary to adequately authenticate the user for the particular transaction.

13. The method as in claim 1, further comprising:
determining a username of the user; and
determining a current authentication level of the user based on a database lookup using the username;
wherein determining whether the particular intercepted call triggers the enhanced user authentication requirement for the particular transaction is based at least in part on the current authentication level of the user.

14. The method as in claim 1, wherein whether the user is an adequately authenticated user for the particular transaction is based on a sufficient level of confidence that the user is who the user purports to be.

15. The method as in claim 1, wherein the corresponding challenge to adequately authenticate the user for the particular transaction comprises a pop-up window apart from the executing application.

16. The method as in claim 1, wherein determining whether the particular intercepted call triggers the enhanced user authentication requirement for the particular transaction, initiating the corresponding challenge to adequately authenticate the user for the particular transaction, and allowing the particular intercepted call to proceed for the particular transaction in response to the adequately authenticated user for the particular transaction are performed without participation by the executing application.

17. The method as in claim 1, wherein intercepting calls made for transactions within the executing application comprises intercepting calls into an application programming interface (API) of the executing application with the Java agent.

18. A tangible, non-transitory, computer-readable medium storing program instructions that cause a computer to execute a process comprising:
intercepting, with a Java agent that monitors execution of an executing application with instrumentation, calls made for transactions within the executing application;
determining whether a particular intercepted call triggers an enhanced user authentication requirement for a particular transaction;
initiating, in response to the particular intercepted call triggering the enhanced user authentication requirement, a corresponding challenge to adequately authenticate a user for the particular transaction; and
allowing the particular intercepted call to proceed for the particular transaction in response to an adequately authenticated user for the particular transaction by passing the particular intercepted call through to a destination of the particular intercepted call.

19. An apparatus, comprising:
one or more network interfaces;
a processor coupled to the one or more network interfaces and configured to execute one or more processes; and
a memory configured to store a process that is executable by the processor, the process when executed configured to:
intercept, with a Java agent that monitors execution of an executing application with instrumentation, calls made for transactions within the executing application;
determine whether a particular intercepted call triggers an enhanced user authentication requirement for a particular transaction;
initiate, in response to the particular intercepted call triggering the enhanced user authentication requirement, a corresponding challenge to adequately authenticate a user for the particular transaction; and
allow the particular intercepted call to proceed for the particular transaction in response to an adequately authenticated user for the particular transaction by passing the particular intercepted call through to a destination of the particular intercepted call.

* * * * *